Figures 1, 2:
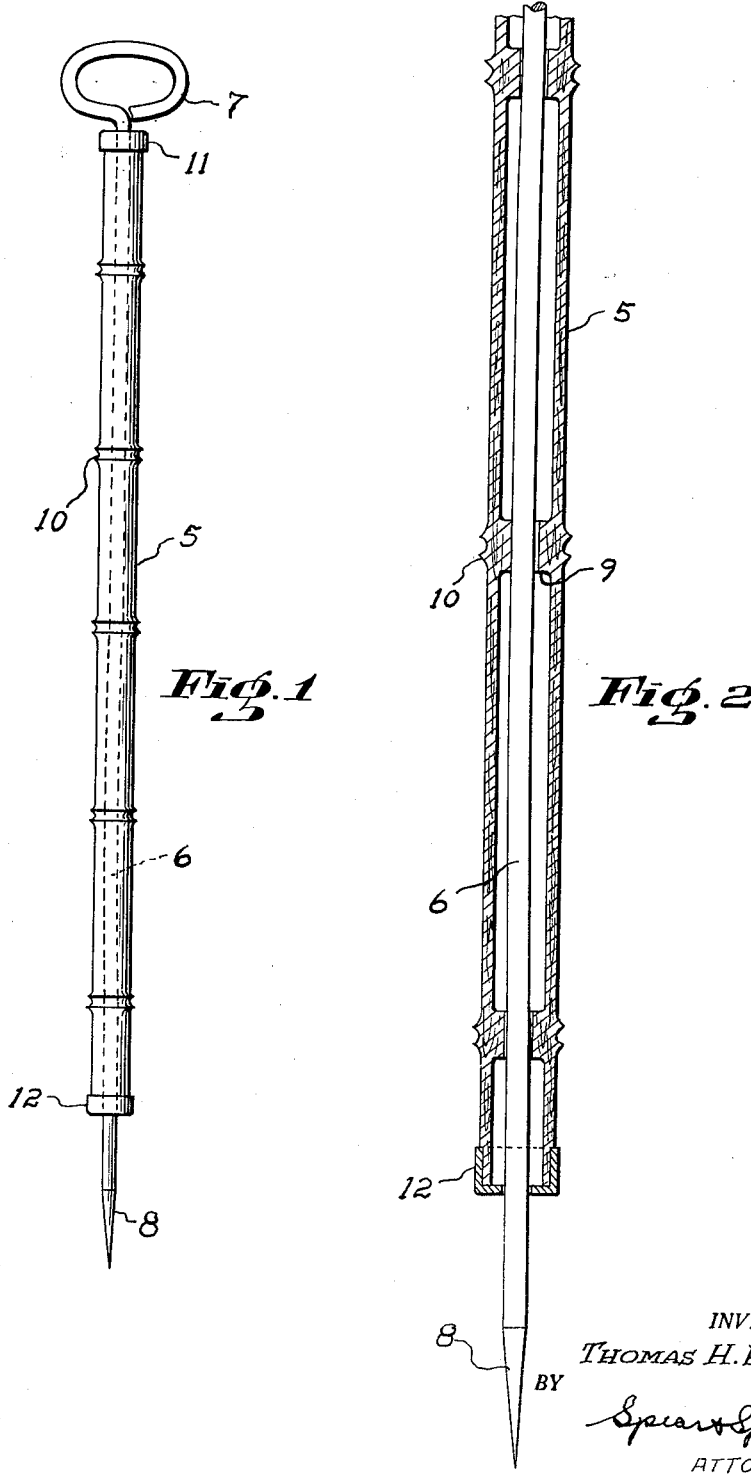

June 17, 1952     T. H. FAHEY     2,600,981
LITTER COLLECTOR
Filed Oct. 21, 1948

INVENTOR.
THOMAS H. FAHEY
BY
Spear & Spear
ATTORNEYS

Patented June 17, 1952

2,600,981

UNITED STATES PATENT OFFICE 2,600,981

LITTER COLLECTOR

Thomas H. Fahey, Portland, Maine

Application October 21, 1948, Serial No. 55,679

4 Claims. (Cl. 294—61)

My present invention relates to a litter collecting device.

Much time is wasted by those engaged in keeping streets and parks clean because of the lack of adequate means by which various types of unsightly or unsanitary waste may be quickly and easily picked up and transferred to a waste receiving receptacle. While pointed rods or sticks have been used for this purpose, they are not satisfactory in that it is often difficult to transfer gathered waste to the receptacle without handling the impaled refuse.

In accordance with my invention, I provide a litter collecting device consisting of a tubular sheath having a rod slidably mounted therein. The rod has a handle at one end and has an impaling point at its other end and is dimensioned so that when the handle is seated against one end of the sheath, the point is operatively exposed beyond its other end. An intermediate portion of the rod is bowed so that it frictionally engages the sheath thereby preventing the sheath and the rod from becoming accidentally separated or the point from being accidentally exposed.

When such a device is to be used, its pointed end is exposed so that waste may be impaled and picked up. When the user wishes to remove impaled waste, it is only necessary to advance the sheath relative to the rod to force the waste from the point.

In the accompanying drawings, I have shown an illustrative embodiment of my invention from which those and other of its novel features and advantages will be readily apparent.

In the drawings:

Fig. 1 is a side view of a litter collecting device in accordance with my invention, and Fig. 2 is a fragmentary sectional view, on an enlarged scale, of such a device.

At 5 I have indicated a tubular sheath adapted to slidably receive the rod 6 which has at one end a handle 7 and at its other end an impaling point 8 which is of hardened steel and preferably relatively long taper. The rod 6 is dimensioned so that when the handle 7 engages one end of the sheath 5, the point 8 is operatively exposed.

In practice, I prefer to form the sheath 5 from bamboo because it is light in weight even when of a substantial diameter such as is desirable to afford a satisfactory hand grip and is adapted to be readily bored to receive the impaling rod 6. A feature of bamboo is its nodal portions 9 which form spaced annular portions 10 that prevent the user's hand from slipping when the sheath 5 is moved relative to the rod 6 to expose or retract the impaling point 8.

As will be apparent from Fig. 2, the nodal portions 9 are bored to receive the rod 6 freely while the rod 6 is slightly bowed intermediate its ends for substantially the entire length of the sheath 5 to have a tight frictional fit in the sheath 5. This is important as it not only prevents the rod 6 from becoming accidentally detached from its sheath 5 but also because it ensures that the point 8 will remain in a retracted or exposed position while the device is being carried.

I provide the upper end of the sheath 5 with a cap 11 engageable by the handle 7 and its lower end with a cap 12 engageable by refuse impaled on the point 8 thereby to force it therefrom when the device is operated to effect a retracted position of the point 8.

From the foregoing, it will be apparent that litter collecting devices in accordance with my invention are inexpensive to manufacture, simple in construction, and adapted to afford maximum convenience to the user in collecting any litter that may be impaled.

What I therefore claim and desire to secure by Letters Patent is:

1. A litter collecting device consisting of a tubular sheath and a rod slidably mounted in said sheath and being of appreciably lesser diameter than the inside diameter of said sheath, said rod including a handle at one end and an impaling point at its other end and being of such length that when the handle is seated against one end of the sheath, said point is exposed beyond the other end of the sheath, said rod including an intermediate bow portion effecting its frictional engagement with the sheath interior, and an annular shoulder at said other end of said sheath establishing a port of substantially the diameter of said rod and providing a flat surface by which litter is forced from said point as said handle is withdrawn from its seated position.

2. The device of claim 1 in which the bowed portion is substantially as long as said sheath.

3. A litter collecting device consisting of a bamboo sheath, the nodal portions of which have passages therethrough, and a rod dimensioned to extend freely through said passages, said rod including a handle at one end and an impaling point at its other end and being of such length that when the handle is seated against one end of the sheath, said point is exposed beyond the other end thereof, and said rod including an intermediate bow portion effecting its frictional engagement with said nodal portions.

4. The device of claim 3 in which the sheath has a flat surfaced metal cap at each end having a rod receiving aperture of substantially the same diameter as the rod.

THOMAS H. FAHEY.

REFERENCES CITED

The following references are of record in the file of this patent:

UNITED STATES PATENTS

| Number | Name | Date |
|---|---|---|
| 1,234,794 | Orson | July 13, 1917 |
| 1,477,397 | Underwood | Dec. 11, 1923 |
| 1,755,646 | Halstead | Apr. 22, 1930 |
| 2,049,298 | Jung | July 28, 1936 |

FOREIGN PATENTS

| Number | Country | Date |
|---|---|---|
| 23,254 | Great Britain | Nov. 30, 1894 |